United States Patent [19]

Cummings

[11] Patent Number: 4,906,726

[45] Date of Patent: Mar. 6, 1990

[54] WATER-BASED COATING COMPOSITIONS CONTAINING HYDROXIDES AND OXIDES OF CALCIUM, STRONTIUM AND BARIUM

[75] Inventor: Lowell Cummings, San Anselmo, Calif.

[73] Assignee: Adhesive Coatings Co., San Mateo, Calif.

[21] Appl. No.: 322,522

[22] Filed: Mar. 13, 1989

[51] Int. Cl.[4] .................................................. C08G 2/00

[52] U.S. Cl. .................................... 528/230; 528/233; 528/245; 528/246; 528/250; 528/256; 528/259; 528/263; 528/264; 525/504; 525/509; 525/510; 524/596

[58] Field of Search ............... 528/230, 233, 245, 246, 528/250, 256, 259, 263, 264; 525/504, 509, 510; 524/596

[56] References Cited

U.S. PATENT DOCUMENTS

| | | | |
|---|---|---|---|
| 4,490,510 | 12/1984 | Cummings | 525/490 |
| 4,574,145 | 3/1986 | Cummings | 525/509 |
| 4,659,787 | 4/1987 | Cummings | 525/504 |

*Primary Examiner*—John Kight
*Assistant Examiner*—S. A. Acquah
*Attorney, Agent, or Firm*—Hosier & Sufrin, Ltd.

[57] ABSTRACT

A water-based coating composition comprising as the first component, a mixture of a polyaldehyde chosen from the group consisting of glyoxal, glutaraldehyde and derivatives of glyoxal and glutaraldehyde, and a water dispersible component chosen from the group consisting of epoxy resin emulsions which can be emulsified in water, synthetic latexes stable at about pH 7 or less, low molecular weight resin emulsions, epoxy ester emulsions, water emulsified alkyds, and cationic, anionic and non-ionic asphalt emulsions and, as the second component, the non-gel reaction product of (I) urea-formaldehyde ether monomer, urea-formaldehyde phenol monomer, urea-nonylphenol formaldehyde monomer, thiourea-formaldehyde ether monomer, melamine formaldehyde ether monomer hexamethoxymethyl melamine, with (II) a polyamine chosen from a group consisting of primary and secondary amines and/or a monoamine, combined with (III) a hydroxide or oxide of calcium, strontium or barium.

28 Claims, No Drawings

WATER-BASED COATING COMPOSITIONS CONTAINING HYDROXIDES AND OXIDES OF CALCIUM, STRONTIUM AND BARIUM

BACKGROUND OF THE INVENTION

This invention relates generally to water-based coating compositions and, more particularly, to water-based coating compositions which cure by way of an initial rapid cure stage in which a protective coating is formed, a slower curing stage in which a hard coating with outstanding wear characteristics is produced, and a drying stage in which water present in the coating is released. In addition, the coating compositions can be applied and will cure rapidly under a wide range of environmental conditions, are free of environmentally objectionable organic solvents such as glycols, glycol ethers, paint thinners, etc., and are outstandingly long-wearing and adherent.

In one important embodiment, this invention relates to water-based coatings which can be applied to asphalt and concrete road surfaces and other types of pavements under weather conditions ranging from sunshine to rain to cool temperatures, yet can be driven on almost immediately after application under all of these application conditions.

In another important embodiment, this invention relates to solvent-free rapidly curing coating compositions suitable for application to steel and other surfaces commonly coated with conventional epoxy systems. In yet another important embodiment, the invention relates to coatings which can be applied at substantial thicknesses without significant sagging even on vertical and underside surfaces. In a still further embodiment, this invention relates to new water-based asphalt emulsion coating compositions which can be applied to roads, tarmacs, driveways and other surfaces by spraying, which dry almost instantaneously and which resist gasoline and most organic solvents.

Although the present invention will find application in numerous areas from traffic paints, to coatings for steel and other materials, to asphalt emulsions, for convenience, the primary focus of the description below will be on traffic paint applications. The invention, however, is not intended to be so limited but rather is to be construed as having application in any environment to which it is suited.

Traffic paints are the most common asphalt and concrete road coatings. For decades, traffic paints have been formulations of alkyd combined with various resins. Such formulations usually contain environmentally objectionable organic solvents. They cure or dry slowly, and therefore present logistical problems in preventing road traffic from destroying or degrading the markings before the paint is dry. Finally, alkyd/resin coatings lose thickness due to loss of solvent on drying and are not as durable as might be desired, particularly in demanding traffic applications.

In recent years, more durable coatings have been developed for traffic applications. These include epoxy and polyester paints, preformed tapes and thermoplastics.

Epoxy paints have the greatest potential as traffic paints in terms of durability and cost-effectiveness. Yet, in application, epoxy paints have heretofore presented serious drawbacks. Conventional epoxy paints use a two component epoxy mixed with a solvent which keeps the mixture fluid until it is ready to be applied. The presence of the solvent is environmentally highly undesirable, since it is ultimately released into the atmosphere. In addition, conventional epoxy coatings lose thickness on drying and tend to yellow with the passage of time.

Recently introduced epoxy paints having 100% solids eliminate the solvent release problem, but have other significant drawbacks. For example, 100% solids systems require heating before application, which makes them more difficult and expensive to use. In addition, since these systems typically require two parts of a highly viscous epoxy resin to one part curing agent, the mixture is mechanically difficult to use. These 100% solvent-free epoxy paints require about 15 minutes to cure to a degree sufficient to permit drive-over in traffic paint applications. Thus, the logistical problems of traffic re-routing are still present for both the conventional solvent-based and the solvent-free epoxy coatings since both require time to dry before traffic can pass over them.

SUMMARY OF THE INVENTION

The principal composition of the present invention comprises a combination of two components, designated Part A and Part B, which, when mixed, form a coating that can be applied and will cure rapidly under weather conditions ranging from sunshine to rain to cool temperatures, that will not release environmentally objectionable organic solvents and that will leave a long-wearing and adherent coating.

When Parts A and B are mixed, the resulting composition cures by way of an initial rapid cure stage in which a protective coating is formed, a slower curing stage in which a hard coating with outstanding wear characteristics is produced, and a drying stage in which water present in the coating is released. The initial protective film resists pick-up and withstands moderate wear while a hard coating with outstanding wear characteristics is formed. As explained below, the slower curing stage proceeds in one or more steps, depending upon the curing rates of the coating materials contributing to the final hard coating. It is a unique characteristic of this composition that, immediately after completion of the rapid cure stage, it produces a coating that is not wet to the touch, notwithstanding the fact that the slower curing stages are not yet complete.

The coating of the invention can be applied to asphalt and concrete road surfaces under weather conditions ranging from sunshine to rain to cool temperatures, yet can be driven on almost immediately after application under all of these application conditions. It can also be applied to steel and other surfaces commonly coated with conventional epoxy systems. It can be applied at substantial thicknesses without significant sagging even on vertical and underside surfaces. Finally, it can be formulated as a water-based asphalt emulsion coating composition which can be applied to roads, tarmacs, driveways and other surfaces by spraying, to dry almost instantaneously and resist gasoline and most organic solvents.

PART A

Part A comprises a mixture of a polyaldehyde and an aqueous component, as described below.

Useful polyaldehydes include glyoxal and glutaraldehyde, and derivatives of either of those compounds, as described below, which retain free aldehyde groups.

Glyoxal is a preferred polyaldehyde in the practice of the invention.

Preferred polyaldehyde derivatives may be obtained by reacting glyoxal or gluteraldehyde with urea, urea and formaldehyde, melamine, or melamine and formaldehyde. A particularly preferred polyaldehyde derivative is the reaction product of melamine and glyoxal in a mole ratio of at least about 1:6. In yet more preferred embodiment, melamine and glyoxal are combined in a mole ratio of melamine to glyoxal of at least about 1:8. Since the melamine accepts six glyoxal molecules, mole ratios in excess of 1:6 will provide an excess of glyoxal which has been found to prevent gelling of the reaction product on standing.

The reaction product of melamine and glyoxal is depicted in the following formula:

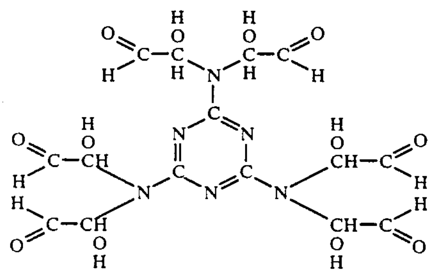

Other useful Part A polyaldehydes include the reaction product of acrylamide and glyoxal or glutaraldehyde, or a reaction product of acrylamide and a derivative of either glyoxal or glutaraldehyde which retains reactive aldehyde groups. In a particularly preferred embodiment, the glyoxal, glutaraldehyde or reaction product of a derivative of either is reacted with the acrylamide in a mole ratio of about 2:1, based on aldehyde moieties.

A further useful group of polyaldehydes comprise the reaction product of glyoxal, glutaraldehyde, or derivatives of either with acrylamide which has been copolymerized with conventional vinyl monomers to form a latex.

In one alternative embodiment, the acrylamide is copolymerized with conventional vinyl monomers before it is reacted with glyoxal, gluteraldehyde, or a derivative of either. In this embodiment, the acrylamide should be copolyerized with from about 2 to 15 percent by weight of conventional vinyl monomers before it is reacted with glyoxal, gluteraldehyde, or a derivative of either. Preferably, however, it is copolymerized with from about 5 to 10 percent by weight of conventional vinyl monomers and most preferably, the acrylamide is copolymerized with about 5 percent by weight of conventional vinyl monomers before it is reacted with glyoxal, gluteraldehyde, or a derivative of either. Examples of useful conventional vinyl monomers include styrene and higher molecular weight acrylates such as ethyl acrylate, ethylhexyl acrylate, butyl methacrylate, methyl methacrylate, and hydroxy ethyl acrylate. As those skilled in the art will recognize, it is preferred that some polarity be introduced by incorporating hydroxy groups. This may be accomplished by including at least about 15% by weight of hydroxy ethyl acrylate with whatever other vinyl monomers are copolymerized with the acrylamide.

The aqueous component of Part A is selected from the group consisting of (I) epoxy resin emulsions, (II) an aqueous component other than an epoxy resin emulsion selected from the group consisting of synthetic latexes stable at pH 7 or less, low molecular weight resin emulsions, epoxy ester emulsions, water emulsified alkyds, and cationic-, anionic- and non-ionic asphalt emulsions, and (III) mixtures of (I) and (II).

The epoxy resin emulsion of Part A of this embodiment of the invention may be an emulsion of any epoxy containing polymer. Perferably the epoxy containing polymer will be emulsifed in water. Typical useful, water emulsifiable epoxy containing polymers include condensation products of epichlorohydrin and bisphenol A. Preferred among these are epoxy resins having a weight per epoxy ("WPE") of about 190 or a molecular weight of about 380.

Other useful epoxy containing polymers include higher molecular weight condensates of epichlorohydrin and bisphenol A. While such higher molecular weight materials are more difficult to emulsify in water, they are nevertheless also suitable for use in the practice of the present invention.

One epoxy containing polymer which has been found to be useful in the practice of this invention is EPON 828 (WPE 190). The structure of this representative conventional epoxy containing polymer is:

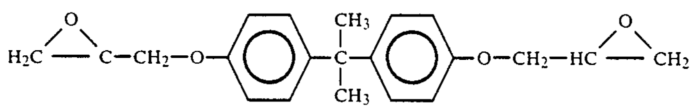

Although it is preferred that emulsifiable epoxy resins be used in Part A of this embodiment, in other useful embodiments some or all of the epoxy resins in Part A may be replaced by incorporating other water-dispersible coating materials in Part A and/or Part B of the composition. Such alternative water-dispersible coating materials include synthetic latexes, water emulsified alkyds, low molecular weight resin emulsions, epoxy ester emulsions and cationic and non-ionic asphalt emulsions. Since the epoxy resin emulsions and each of these alternative coating materials cure or dry at different rates, where more than one slower curing material is used, the slower curing stage will proceed in steps corresponding to the cure or dry time of each material.

Typical useful synthetic latexes include the numerous common paint latexes used in conventional latex paints, such as polyvinyl acetate latexes, vinyl acrylic latexes, acrylic latexes, styrene-acrylic latexes and styrene-butadiene latexes. When it is desired to incorporate the latex into Part A of the composition, the latex chosen should be stable at a pH of about 7 or less. When it is desired to incorporate the latex into Part B, the latex chosen should be stable at a pH of at least about pH 11. Latexes to be incorporated into Part B should include an emulsifier system which tolerates high pHs such as emulsifier systems designed to be used in high pH systems.

Vinyl acrylic latexes which may be used in the present invention include copolymers containing about 10–15% by weight acrylic monomer and about 85–90% vinyl acetate monomer. These latexes typically have a pH of about 4 to 5 making them particularly compatible with the glyoxal of Part A, which is very stable at low pH levels. Such vinyl acrylic latexes include POLYCO 2160, 2161, and 2186 which are available from Rohm & Haas Company of Philadelphia, Pennsylvania. Among this group, POLYCO 2186 is preferred in traffic paint applications because of its low glass transition temperature (5° C.) and it flexibility.

Acrylic latexes which are useful in the practice of the present invention include UCAR 123 and UCAR 503 which are available from Union Carbide Emulsion Systems of Cary, North Carolina. UCAR 123 is a 60% solids material having a pH of 5.8; UCAR 503 is a 58% solids material weighing 9.2 pounds per gallon and having a pH of 6.0. A useful styrene-acrylic latex is available from Speciality Polymers of Woodburn, Oregon under the trademark M-405. This styrene-acrylic latex, which contains about 50% by weight solids dispersed in water, is stable at very high pHs, and is therefore well-suited for incorporation in Part B. A styrene-butadiene latex which is useful in the practice of the invention is Dow S/B latex, particularly Dow S/B Latex #1 and #5 (also known as RAP 213 and RAP 212) which are available from The Dow Chemical Company of Midland, Michigan.

Useful low molecular weight resin emulsions may be made from any water-dispersible polymer or copolymer resin of molecular weight under about 5000. For example, low molecular weight polyethylene wax-like materials which are emulsifiable in water can be used. Allied Corporation of Morristown, New Jersey offers two such materials, A-C6, a homopolymer of polyethylene (approximate molecular weight 2000) and A-C 540, a polyethylene/acrylic acid copolymer (approximate molecular weight 3200). These Allied Chemical materials can be emulsified in water by conventional means. Other examples of low molecular weight resin emulsions include tall oil rosin ester aqueous dispersions having molecular weights under about 500 such as Aquatac 5560 and Aquatac 5090 which are available from Sylvachem of Panama City, Florida.

PART B

Part B of the coating composition of this invention comprises the non-gel reaction product of (I) urea-formaldehyde ether monomer, urea-formaldehyde phenol monomer, urea-nonylphenol formaldehyde monomer, thiourea-formaldehyde ether monomer, melamine formaldehyde ether monomer, hexamethoxymethyl melamine, with (II) a polyamine chosen from the group consisting of primary amines, and secondary amines and amide-amines and with (III) a hydroxide or an oxide of calcium, strontium or barium.

The urea-formaldehyde ether monomers, for example, are represented by the following uron structure, in which R is a methyl, ethyl, propyl, or butyl radical:

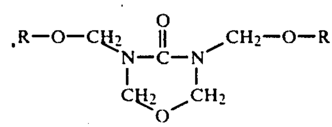

There may be small amounts of methylol groups in these urea-formaldehyde monomers. These methylol groups react with the polyamine in the same manner as the ethers react. Additionally, urea-formaldehyde ether monomers in which some polymerization has occurred may be used. The level of methylol groups should be short of that which would form a gel on reaction with the amine or, otherwise stated, the monomers should comprise a "non-gel product." N,N'-bis(methoxymethyl) uron is the preferred ether monomer in the practice of this invention. The structure and synthesis of the above reaction products of polyamines and urea-formaldehyde ether monomers are described in U.S. Pat. Nos. 4,490,510, 4,574,145, and 4,659,787 to the present inventor.

Monoamines can be blended with the polyamines of Part B in any proportion up to 100% replacement of the polyamines. Monoethanolamine, $HCOH_2CH_2NH_2$, is the preferred monoamine. The mole ratio of polyamine to monoamine should range from about 1:0 to 1:3 and more preferably from about 1:0 to 1:1. The polyamines together with the monoamines when used will be present in a mole ratio to the N,N'-bis(methoxymethyl) uron or other above listed monomers of from about 2:3 to about 5:1 and more preferably from about 1:2 to about 4:1, with the caveat that the upper limit on the amines will be reduced for a particular amine when necessary to prevent gel formation with that amine or, otherwise stated, to produce a "non-gel reaction product."

The polyamines (and monoamines, when present) of Part B must be able to react with the polyaldehydes of Part A to form the initial protective film without producing unacceptably large or violent exotherms and without producing undesirable darkness in the film which would detract from the color of the final coating. Polyamines satisfying these criteria include any primary or secondary amine. Specific preferred polyamines of Part B include hexamethylene diamine, polyoxypropylene diamine, and mixtures of hexamethylene diamine and polyoxypropylene diamine. Specific preferred polyamine/monoamine blends include mixtures of hexamethylene diamine and monoethanol amine in mole ratios of about 1:4 to about 4:1.

In one particularly preferred embodiment of the invention, Part B is a difunctional curing agent prepared by reacting two moles of hexamethylene diamine, two moles of monoethanolamine and one mole (or four equivalents) of N,N'-bis(methoxymethyl) uron.

In another particularly preferred embodiment of the invention, Part B is a trifunctional curing agent prepared by reacting three moles of hexamethylene diamine, one mole of monoethanolamine and one mole (or four equivalents) of N,N'-bis(methoxymethyl) uron.

Part B may include hexamethylene diamine isomers such as 2-methylpentamethylene diamine and 1,2-diamine cyclohexane. In addition, some or all of the hexamethylene diamine or hexamethylene diamine isomers may be replaced by isophrone diamine, trimethyl hexamethylene diamine or xylene diamine. 2-Methylpentamethylene diamine many times is preferred over hexamethylene diamine due to its ease of handling and currently lower price.

In another embodiment, where outstanding coating flexibility is desired, the combination of hexamethylene diamine with polyoxypropylene diamine may be employed. In this embodiment it is preferred that the polyoxypropylene diamine be of molecular weight preferably between about 230 and 400 and less preferably up to about 2000, in a ratio ranging from about 4 moles hexamethylene diamine to 1 mole of polyoxypropylene diamine (4:1) to about 1 mole of hexamethylene diamine to about 4 moles of the polyoxypropylene diamine (1:4).

Preferred polyoxypropylene diamines include Jeffamine D-230 and D-400 available from Texaco Chemical Co. (See U.S. Pat. Nos. 3,236,895 and 3,654,370). Useful alternatives to the polyoxypropylene diamines, also available from Texaco Chemical Co., include Jeffamine T-403 (polyoxypropylene triamine, molecular weight 400), Jeffamine E.D. Diamine (polyoxyethylene diamine, molecular weight 600) and Jeffamine D2000 (molecular weight 2000).

Part B is formed by first reacting the polyamine (and/or the monoamine) with the above-described monomers and preferably with the N,N'-bis(methoxymethyl) uron to produce a non-gel urea-formaldehyde/amine reaction product, as described in U.S. Pat. Nos. 4,490,510 and 4,574,145. Urea nonylphenol formaldehyde monomer, may be used in lieu of the N,N'-bis(methoxymethyl) uron where the low toxicity nonylphenol alternative is desired. This compound is made by heating the N,N'-bis(methoxymethyl) uron and nonylphenol together. Urea nonylphenol formaldehyde monomer is described in U.S. Pat. No. 4,490,510.

The hydroxide or oxide of calcium, strontium and barium is combined wit the above reaction product by any conventional means such as by mixing in a disc impeller paint mixer apparatus. When slurried or dissolved in water, the hydroxide or oxide of calcium, strontium and barium will have an alkalinity of at least about pH 12.0.

Calcium compounds, including particularly $Ca(OH)_2$ and CaO are preferred. Where a calcium compound is to be used, either portland cement or lime may be used as sources of $Ca(OH)_2$ and CaO. The level of calcium, strontium and barium compound will be determined on a case by case basis. In any event, no less than no less than 1% by weight of the calcium, strontium or barium compound, based on the level of aldehyde in Part A, will be used. Additionally, the concentration of calcium, strontium or barium compound in Part B must be below that level which would cause Part B to set up or harden before it is mixed with Part A.

When Part B is then combined with Part A, the excess polyamine and/or monoamine available after completion of the polyaldehyde/amine rapid cure reaction is available for a slowly curing reaction with the epoxy in the epoxy resin based embodiment of the invention. The level of polyamine and/or monoamine necessary will depend upon the nature of the polyamine, on whether epoxy is used, and if so, the nature of the epoxy. These levels can be readily ascertained by one skilled in the art. Of course, in embodiments where a water-dispersible component other than epoxy resin is used, no excess polyamine or monoamine will be needed and the water-dispersible component simply cures at its own relatively slow rate without the use of an accelerator or curing agent.

In traffic paint applications, an initial film strong enough to bear traffic and to resist paint pick-up in as little as 30 seconds after application can be obtained in accordance with the invention. Meanwhile, the epoxy resin of Part A reacts with the remainder of Part B in a relatively slow cure reaction to produce after several hours time an epoxy coating with outstanding durability and adherence.

Pigments may be introduced in all embodiments into either or both of Parts A and B. Conventional pigments such as $TiO_2$, lead chromate, or conventional extender/pigments such as $SiO_2$ and $CaCO_3$ and conventionally available clays may be used. Pigment volume concentrations in the range of about 30 to 55% give outstanding adhesion.

Application of the present rapidly reacting system can be accomplished by spraying Parts A and B from separate spray guns so that the two sprays meet on the target surface. Mixing of the components preferably takes place both in the spray patterns and on the target surface. See U.S. Pat. No. 3,475,359, Example 10, for a description of the use of this application technique. Alternatively, Parts A and B can be combined in an internal mixing chamber of a rapidly acting sprayer such as a Binks Model 43PA and then immediately applied to the target area.

It is desirable to incorporate particulate matter such as sand and/or glass beads into the coating composition of the invention to improve the durability of the coating ultimately obtained.

Where it is desired to incorporate glass beads into traffic paint coatings to enhance night visibility (referred to as "retroreflectivity" in the art) glass beads (commonly about 5 to 10 mil in diameter) may be sprayed onto or otherwise introduced into the coating. In addition, larger beads (about 40 mils in diameter) may be used and are preferred for wet weather visibility since smaller beads are rendered almost useless by the water film present on the paint surface in wet weather. In order to achieve good imbedding of these large glass beads, a coating of at least 20 mils is preferred.

Where night visibility is not a necessary or desirable objective, it is nevertheless desirable to incorporate particulate matter such as sand into the coating composition. The level of glass beads and/or other particulate matter may range from about 3 to 15 pounds per gallon of coating and more preferably from about 8 to 12 pounds per gallon of coating. When 40 mil glass beads are used in the coating described in this invention, it has been found to be particularly desirable to use a level of beads which will insure that at least 75% of the surface area is covered with beads.

The coatings of the present invention will be particularly useful in traffic paints and in other environments where it is useful or necessary to be able to apply them under cool or wet conditions, or where it is desirable that the coated surfaces be ready for use almost immediately after application. The coatings of the present invention will also be particularly useful where it is desirable to be able to obtain thick coatings which do not sag or require a multiplicity of applications to attain the desired coating thickness.

Each of the components of the coating composition of this invention are in aqueous solution. There are no requirements for coupling solvents such as glycols and glycol ethers which are used in conventional water-based latex paints, so there need not be any organic solvents in the system. However, under certain circumstances it may be desirable to add small amounts of commercially available materials which include organic solvents to modify certain properties of the composition in accordance with common industrial practices. Finally, when asphalt emulsions are blended into Part A, and then Part B is mixed in as by spraying as described above, the resulting coating is highly resistant to gasoline, fuel oil and other organic solvents. This follows from the fact that the aldehyde/amine reaction products are extremely insoluble in practically any organic solvent.

The following examples are intended to illustrate the practice of the present invention. These examples are not intended to be exhaustive or limiting of the invention.

EXAMPLES

1. Preparation of an Emulsion of Liquid Epoxy Resin

In a 2 liter stainless steel container were placed 1000 gm. of liquid epoxy resin of about WPE 190 of molecular weight about 380, such as EPON 828, made by Shell Chemical Co. Added to this was a mixture of 50 gm. of water and 50 gm. of a non-ionic emulsifier such as a condensation product of a nonylphenol and polyethylene oxide with a polyethylene chain length of about 40 to 50 units. Typical such useful non-ionic emulsifiers include GAF's IGEPAL CO977 and Quad Chemical's CARSONON N-50. Another useful non-ionic emulsifier which is specifically designed for making epoxy emulsions is Capcure Emulsifier 65, which is available from Henkl Corporation. It is believed that this emulsifier is a stearic acid ester of polyethylene oxide with a chain length between 20 and 50 units.

This mixture was stirred with a propeller type stirrer until a uniform water-in-oil emulsion was formed. More water was slowly added with strong stirring until the emulsion changed from water-in-oil to oil-in-water, at around 75% epoxy resin level. Additional water was then added to bring the emulsion to the desired solids level of about 60–65% by weight.

2. Preparation of a Blend of Glyoxal and Epoxy Resin Emulsion (Part A)

Although glyoxal is normally supplied at a pH of about 2, if used at this pH, the glyoxal, when combined with the epoxy resin emulsion, could degrade the epoxy resin. Therefore, the glyoxal was neutralized to a pH of about 6 and then mixed with the epoxy emulsion produced in Example 1.

Neutralization of the glyoxal to a pH of about 6 is easily done by adding small amounts of preferably sodium bicarbonate or even calcium carbonate pigment, which can serve as well as an extender pigment. Once the glyoxal is at pH 6 it is blended with the epoxy emulsion by mixing with a slow-speed mixer in order to avoid excessive shear which would be detrimental to the emulsion, thereby forming a mixture which is found to be stable indefinitely.

3. Making a Pigment Dispersion in Neutralized Glyoxal Followed by Addition of Epoxy Resin Emulsion Since the ordinary commercial grade of glyoxal (40% glyoxal in 60% water) has unusually good pigment dispersing properties, it can be used as the pigment dispersing liquid without adding other pigment dispersing agents. In fact, there is very little pigment settling on standing and no hard pigment cake develops on the bottom of the container as experienced in many conventional systems.

Furthermore, when these glyoxal pigmentations are passed through a high-pressure airless spray pump, some pigment is forced out of suspension by the high pressure and the pigment may cake around the ball valves of the airless pump. This may be avoided by including in the pigment grind a small amount of a non-ionic emulsifier or a non-ionic pigment wetting agent such as Capcure 65 (which would serve as both an emulsifier and a wetting agent). Since Capcure 65 may serve in the present composition as an epoxy emulsifier, it would do double duty in this fashion.

The following table illustrates paint formulas in accordance with the invention. A 100 gallon basis has been chosen merely for convenience so that volumes of Part A and B (50 gallons of Part A to 50 gallons of Part B) can be readily calculated. These volume formulas are also useful because the application from spray guns is done on a volume basis. The most convenient volume ratio for spray application is a ratio of Part A to Part B of about 1:1.

White Formula For Parts A and B
High solids, low $H_2O$ content, 48% pigment volume concentration ("PVC")

| | 61 Gallons | Pounds | Solids Gallons | Solids |
|---|---|---|---|---|
| Part A | | | | |
| Glyoxal, 40% | 125 | 11.9 | 50 | 4.0 |
| $H_2O$ | 90 | 10.8 | — | — |
| non-ionic pigment wetting agent* | 27.5 | 3.0 | 17.9 | 1.88 |
| Titanium dioxide** | 125 | 3.68 | 125 | 3.68 |
| Silica extender pigment*** | 250 | 11.36 | 250 | 11.36 |
| Emulsion liquid epoxy resin**** | 93 | 9.12 | 50 | 5.15 |
| | 710.5 | 49.9 | 492.9 | 26.07 |
| Part B | | | | |
| $H_2O$ | 75 | 9.0 | — | — |
| Amine curing agent containing $Ca(OH)_2$ as described in Example 7 below | 227 | 27.4 | 200 | 24.1 |
| Silica extender*** | 300 | 13.6 | 300 | 13.6 |
| | 602 | 50.0 | 500 | 37.7 |

*Such as Capcure 65, available from Henkel Chemical Company

**Such as TiPure 902, available from DuPont

***Such as Minex 4, which is a silicate ground to a fine powder or Novacite 550, which is pure $SiO_2$ ground to a fine powder

****Emulsion of 95 parts liquid epoxy resin, 5 parts emulsifier solids such as Capcure 65, the above at 60% of non-volatile in water. (Alternatively, an 85% solids emulsion could be used.)

Yellow Formula For A and B
High solids, low $H_2O$ content, 49% PVC

| | Pounds | Gallons | Solids Pounds | Solids Gallons |
|---|---|---|---|---|
| Part A | | | | |
| Glyoxal, 40% | 117 | 11.1 | 46.8 | 3.75 |
| $H_2O$ | 48 | 5.7 | — | — |
| non-ionic pigment wetting agent* | 26 | 3.3 | 16.9 | 1.77 |
| Titanium dioxide** | 23 | 0.7 | 23 | 0.7 |
| water dispersion of a yellow azo pigment*** | 36 | 3.9 | 15 | 1.5 |
| water dispersed orange azo pigment**** | 60 | 6.1 | 33 | 3.3 |
| Silica extender***** | 234 | 10.6 | 234 | 10.6 |
| liquid epoxy resin emulsion****** | 78 | 8.5 | 46.8 | 4.8 |
| | 622 | 49.9 | 415.5 | 26.42 |
| Part B | | | | |
| $H_2O$ | 75 | 9.0 | — | — |
| Amine curing agent containing portland cement as described in Example 8 below | 227 | 27.4 | 200 | 24.1 |
| Silica | 300 | 13.6 | 300 | 13.6 |

-continued

| | | | | |
|---|---|---|---|---|
| extender***** | 602 | 50.0 | 500 | 37.7 |

*Such as Capcure 65
**Such as TiPure R902, available from DuPont
***Such as Dalamar Yellow YW-911P, available from Heubach
****Such as Dalamar Yellow YW-822P, available from Heubach
*****Such as Minex 4
******Emulsion of 95 parts liquid epoxy resin, 5 parts emulsifier such as the above 60% in $H_2O$ 4. Preparation of Urea-formaldehyde Ether Monomer In a three liter glass flask fitted with a stainless steel paddle, stirrer, thermometer, a pH electrode and a reflux condenser, the following materials were charged:

1152 gm. methyl alcohol (99%) (36 moles)
1187 gm. 91% flake paraformaldehyde (corresponding to 36.0 moles of 100% $CH_2O$)
540 gm. urea (9 moles)

The above mixture, which had an initial pH of about 3.0, was stirred and heated to 40° C. The pH was then adjusted to 10.5 by the addition of a small amount of 40% sodium hydroxide. As the temperature rose to 55° C., the paraformaldehyde and the urea dissolved in the methyl alcohol to give a clear solution. The solution was stirred for about one and a half hours while the temperature was maintained in the range of about 55°-60° C. and the pH was maintained at about 9-10 (by adding sodium hydroxide as necessary) to force the formation of tetramethylol urea.

At this point, a small amount of a 50% aqueous solution of sulfuric acid was added to bring the pH to about 2.5. This caused a mild exotherm, raising the solution temperature to about 78° C. The pH was maintained at 2.0-2.5, and the temperature was maintained at about 80° C. for about 40 minutes. Then the pH was brought to 7.0 with sodium hydroxide. The cooled urea-formaldehyde solution contained suspended $Na_2SO_4$, which was filtered out leaving a water-white, low-viscosity liquid containing about 60% of the non-volatile urea-formaldehyde ether monomer, N,N'-bis(methoxymethyl) uron in methyl alcohol and water.

5. Preparation Of Urea Nonylphenol Formaldehyde Monomer; Hexamethoxymethyl Melamine a. Urea Nonylphenol Formaldehyde Monomer The urea nonylphenol formaldehyde monomer is described in U.S. Pat. No. 4,490,510 where nonylphenol, urea and paraformaldehyde are heated together first at a pH of about 11 and then at a pH of about 1.2 and then neutralized.

The urea nonylphenol formaldehyde monomer was also made by heating together a previously prepared urea formaldehyde monomer and nonylphenol, as follows:

In a 5 liter flask were added

| | | |
|---|---|---|
| 1. | Urea formaldehyde monomer (1.0 poise, 90% solids in water/methanol) | 10 moles (2110 gm.) |
| 2. | Nonylphenol | 10 moles (2200 gm.) |

The mixture was stirred while heating to 110° C. at which time considerable distillation took place. Vacuum was applied bringing on vigorous boiling. When 24 inches of vacuum was achieved, the temperature was about 60° C. Upon cooling to room temperature, a yield of 3730 gm. of a water-white low viscosity product was obtained.

b. Hexamethoxymethyl Melamine

In a 3 liter flask fitted with a paddle stirrer, thermometer and distilling set up, the following were added:

| | |
|---|---|
| Jeffamine D400 | 3.65 moles (1460 gm.) |
| Hexamethylene diamine | 2.25 moles (360 gm.) |
| Melamine formaldehyde monomer | 1.00 moles (280 gm.) |

The Jeffamine D400 and hexamethylene diamine (70% concentration) were stirred in the flask at room temperature whereupon the melamine formaldehyde monomer was added over five minutes' time. Then the temperature was raised to 110° C. and some distillate came over (100° C.). The heat was removed, and 2155 gm. of a translucent water-white liquid remained, (93% solids).

6. Preparation Of Polyaldehyde From Glyoxal And Melamine

In a twelve liter flask, two moles of melamine (252 gms.) were combined with six moles of 40% aqueous glyoxal (348 gms. on 100% glyoxal weight basis). NaOH(40%) was added to the flask with stirring, to bring the pH up from 3 to 6.5.

The flask was heated to about 20°-35° C. whereupon the pH spontaneously increased to approximately 7.9. When the temperature reached 40° C., the external heat was removed, and the mixture was found to exotherm to 50° C. The entire mass turned transparent to cloudy, and gelled.

The same procedure was followed using one mole of melamine (120 gms.) to six moles of glyoxal (348 gms at 100%) to determine whether the gelling problem could be avoided. A slightly viscous, transparent liquid was produced, which would be readily poured. The viscosity of the material was 20 poise at 25° C., 2000 cps, pH 6.05.

It was further discovered that increasing the mole ratio of glyoxal to melamine to 8:1 further improved the viscosity and storage properties of the glyoxal/melamine adduct.

7. Preparation of Amine Curing Agent from Hexamethylene Diamine and Urea Formaldehyde Ether Monomer as Taught in U.S. Pat. No. 4,490,510, Blended with $Ca(OH)_2$ (Part B)

Into a two liter flask equipped with a paddle stirrer, thermometer and distilling setup were placed 953 gm. of 70% solution of hexamethylene diamine in water. This amounted to 667 gm. (5.75 moles) of hexamethylene diamine calculated at 100% concentration.

The hexamethylene diamine was stirred at room temperature and 333 gm. (1.75 moles or 7 equivalents on a 100% solids basis) of N,N'-bis(methoxymethyl) uron (a type of urea formaldehyde resin used in textile treating; see U.S. Pat. No. 3,309,341 as well as Example 4 above for a method of manufacture) were added. The urea formaldehyde reacted with the hexamethylene diamine, causing a mild exotherm (raising the temperature from 20° C. to about 40° C.) and producing methanol and water as by-products. The methanol and a small amount of the water were removed by distilling up to a vapor temperature of 100° C. or slightly higher. The yield of solids in this reaction was 95% of the charged solids. The amount of remaining water in the resin was calculated (about 20% water and 80% solids) and additional water was added to bring the solids to 65%.

500 gm. of $Ca(OH)_2$ were then blended with 500 gm. of the resin in a disc impeller paint mixing apparatus. This Part B component of the composition of the invention is a very low viscosity, translucent aqueous solution of the hexamethylene diamine/urea-formaldehyde monomer/$Ca(OH)_2$ curing agent.

8. Preparation of Curing Agents from 2-methylpentamethylene diamine, Urea-formaldehyde Ether Monomer, with and without Portland Cement (Part B)

In this example two curing agents ("B1" and "B2") using 2-methylpentamethylene diamine were combined with N,N'-bis(methoxymethyl) uron. As seen below, the curing agents differed in that B1 included portland cement and B2 did not. In both cases, the resulting curing agent was a low viscosity, colorless, aqueous solution.

The preparation procedure paralleled that of the previous example. Two amine/uron mixtures were used:

| Amine/uron #1 | |
|---|---|
| 2-methylpentamethylene diamine | 3 moles |
| monoethanolamine | 1 mole |
| N,N'—bis(methoxymethyl)uron | 1 mole |
| **Amine/uron #2** | |
| Jeffamine D400 | 1 mole |
| 2-methylpentamethylene diamine | 3 moles |
| monoethanolamine | 1 mole |
| N,N'—bis(methoxymethyl)uron | 1 mole |

The complete B1 and B2 curing agents respectively comprised:

| B1 | | | | |
|---|---|---|---|---|
| Amine/uron #1 | 100 | 12.08 | 90 | 10.8 |
| Amine/uron #2 | 100 | 12.08 | 90 | 10.8 |
| $CaCO_3$ | 292 | 13.27 | 292 | 13.27 |
| $H_2O$ | 105 | 12.61 | 0 | .0 |
| | 597 | 50.04 | 472 | 34.87 |
| **B2** | | | | |
| Amine/uron #1 | 100 | 12.08 | 90 | 10.8 |
| Amine/uron #2 | 100 | 12.08 | 90 | 10.8 |
| $CaCO_3$ | 200 | 9.09 | 200 | 9.09 |
| White portland cement | 100 | 4.17 | 100 | 4.7 |
| $H_2O$ | 105 | 12.61 | 0 | |
| | 605 | 50.04 | 480 | 34.86 |

9. Preparation of and Application of White Traffic Paint

A white traffic paint coating was prepared by combining the following Part A with Part B1 and Part B2:

| | Pounds | Gallons | Solids Pounds | Solids Gallons |
|---|---|---|---|---|
| Glyoxal | 225 | 21.4 | 90 | 7.2 |
| Capcure Emulsifier 65 | 12 | 1.5 | 7.8 | 0.8 |
| $TiO_2$ | 150 | 4.3 | 150 | 4.3 |
| $SiO_2$ (325 mesh) | 150 | 6.8 | 150 | 68 |
| Liquid epoxy resin (WPE 190) | 90 | 9.3 | 90 | 9.3 |
| $H_2O$ | 56 | 6.7 | — | — |
| | 688 | 50.0 | 48.78 | 28.3 |

The coating was successfully applied to asphalt and concrete pavements with Binks "Formulator" double piston airless spraying units attached to Binks conventional airless spray guns. The standard formulator unit delivered two equal volume streams of liquid to a standard double-headed airless spray gun. The nozzles of the spray guns were about three inches apart and were aimed at a target several inches in front of them, where components A and B1 or B2 met to produce a coating in accordance with the present invention. Application was also undertaken with a Binks Model 43PA unit in which Parts A and B1 or B2 were mixed internally before application with a single airless spray gun.

It was found that the coating prepared with the B1 formulation (which contained portland cement) became dry to the touch at least twice as quickly as the coating prepared with the B2 formulation. In addition, the coating prepared with the B1 formulation exhibited improved toughness and hardness—both initially and over time—as compared to the coating prepared with the B2 formulation. If sand of about 5–10 mil in diameter were introduced into the composition at a level of 10 pounds per gallon of coating, the ability of the coating to resist cracking would be enhanced.

Finally, 40 mil diameter glass beads could be introduced into either formulations using a conventional bead spray gun. About 75% of the surface area of the coating would be covered with these 40 mil beads by spraying the beads onto the paint film from a bead gun positioned one to two inches behind the gun which applied the coating. The coatings would produce a meniscus about the beads resulting in enhanced bead retention after an initial cure of about 30 seconds. These larger beads would produce enhanced visibility in wet weather since the larger beads protruded from the coating film considerably farther than the conventional small beads and in any event well beyond the depth of the water film present on the coating surface.

10. Examination Of Polyamines To Determine Those Suitable For Part B

In this example, 10 grams of various polyamines were reacted with a like amount of glyoxal (40% in water) to determine which polyamines produced acceptable products in terms of appearance, viscosity, and severity of reaction exotherm. The results were as follows:

| Run | Polyamine | Appearance | Exotherm |
|---|---|---|---|
| 1. | diethylene triamine | very dark brown-black semi-solid | extremely vigorous |
| 2. | N—aminoelthyl piperzine | very dark brown-black semi-solid | very vigorous |
| 3. | 50% D-230 25% diethylene-triamine 25% urea form-aldehyde | very dark brown-black semi-solid | vigorous |
| 4. | 40% D-230 15% diethylene-triamine 45% urea form-aldehyde | vey dark viscous liquid | vigorous |
| 5. | 67% hexamethy-lene diamine 33% urea form-aldehyde | light tan strong solid | low |
| 6. | 45% hexamethy-lene diamine 25% D 400 30% urea form-aldehyde | light tan strong solid | low |
| 7. | 70% hexamethy-lene diamine | light tan strong solid | low |

-continued

| Run | Polyamine | Appearance | Exotherm |
|---|---|---|---|
| 8. | isophrone diamine | light tan strong solid | low |
| 9. | 2-methyl pent-amethylene diamine | light tan strong solid | low |
| 10. | meta xylene diamine | light tan strong solid | low |

Runs 5-10 above showed acceptable results, showing that the indicated polyamines could be used in Part B of the invention. The polyamines of runs 1-4 were unacceptable.

11. Preparation and Application of an Alternative White Traffic Paint

A white traffic paint coating which is particularly well suited to striping asphalt substrates can be prepared as described above in Examples 3 and 8 from the following materials:

| | White Formula For Parts A and B | | | |
|---|---|---|---|---|
| | Pounds | Gallons | Solids Pounds | Solids Gallons |
| Part A | | | | |
| Glyoxal, 40% | 140 | 13.3 | 56 | 4.5 |
| $H_2O$ | 32 | 3.8 | — | — |
| Non-ionic pigment wetting agent* | 10 | 1.1 | 6.5 | .6 |
| Titanium dioxide** | 150 | 4.4 | 150 | 4.4 |
| Silica extender pigment*** | 140 | 6.3 | 140 | 6.3 |
| Emulsion liquid epoxy resin**** | 66 | 7.0 | 56 | 5.8 |
| Acrylic latex***** | 125 | 14.0 | 75 | 7.5 |
| | 663 | 49.90 | 483.5 | 29.1 |
| Part B | | | | |
| $H_2O$ | 146 | 17.4 | — | — |
| Trifunctional curing agent as described below (75% solids) | 175 | 20.6 | 131 | 15.4 |
| $Ca(OH)_2$ | 100 | 4.1 | 100 | 4.1 |
| Silica extender*** | 171 | 7.9 | 171 | 7.9 |
| | 592 | 50.0 | 386 | 32.3 |

*Such as Capcure 65
**Such as TiPure 902, available from DuPont
***Such as Minex 4, which is a silicate ground to a fine powder or Novacite 550, which is pure $SiO_2$ ground to a fine powder
****Emulsion of 95 parts liquid epoxy resin, 5 parts emulsifier solids such as Capcure 65, the above at 85% of non-volatile in water
*****Such as UCAR LATEX 123, available from Union Carbide Emulsion Systems of Cary, North Carolina (solids content in weight percent 60%; pH 5.8).

The trifunctional curing agent is made up in a two liter flask equipped with a paddle stirrer, thermometer and distillation apparatus. The flask is charged with 2485 gm. of a 70% solution of a hexamethylenediamine in water. This amounts to 1740 gm. (15 moles) of hexamethylenediamine calculated at 100% concentration. Then 305 gm. (5 moles) of monoethanolamine were added and the mixture is stirred at room temperature while 1605 gm. of urea-formaldehyde (as 59.2% solids in methanol) is introduced. The urea-formaldehyde amounts to 950 gm. (5 moles or 20 equivalents), calculated at 100% solids concentration. The urea-formaldehyde reacts with hexamethylenediamine and monoethanolamine, causing a mild exotherm (raising the temperature from 15° C. to 45° C.) and producing methanol and water as by-products. The methanol and a small amount of the water are removed by distilling up to a vapor temperature of about 100° C. to yield 3447 gm. of product, which comprises a 75% solids concentration. 500 grams of CaO is then blended with 500 grams of this product in a high speed disc impeller paint mixing apparatus.

A coating composition is prepared by combining Parts A and B in a 1:1 ratio. The composition is applied by spraying onto an asphalt substrate. The coating exhibits excellent drying time, adhesion and color. When glass beads are introduced, the composition also exhibits outstanding bead retention under heavy traffic conditions.

In order to enhance the whiteness of the coating, a small amount of a bluing compound could be added to Part A and/or Part B of the composition. For example, enhanced coating whiteness is obtained by adding to Part B of the above composition about 0.73 pounds per 50 gallons of a water-dispersed blue pigment known as AQUASPERSE DISPERSION 877-7504 (ultramarine blue) which is available from Nuodex, Inc. of Piscataway, New Jersey.

12. Preparation and Application of Another Alternative White Traffic Paint

Another white traffic paint coating which is particularly well suited to striping asphalt substrates can be prepared as described above in Examples 3 and 8 from a styrene-butadiene latex using the following materials:

| | White Formula For Parts A and B | | | |
|---|---|---|---|---|
| | Pounds | Gallons | Solids Pounds | Solids Gallons |
| Part A | | | | |
| Glyoxal, 40% | 140 | 13.3 | 56 | 4.5 |
| Non-ionic pigment wetting agent* | 10 | 1.1 | 6.5 | 0.6 |
| Titanium dioxide** | 90 | 2.63 | 90 | 2.63 |
| Silica extender pigment*** | 175 | 8.06 | 175 | 8.06 |
| Emulsion liquid epoxy resin**** | 66 | 7.0 | 56 | 5.8 |
| Styrene-butadiene latex***** | 156 | 18.42 | 75 | 8.66 |
| | 637 | 50.51 | 458.5 | 30.25 |
| Part B | | | | |
| Trifunctional curing agent as described in example 10 (75% solids) | 175 | 20.6 | 131 | 15.4 |
| Styrene-butadiene latex***** | 175 | 20.60 | 84 | 9.7 |
| $Ca(OH)_2$ | 100 | 4.1 | 100 | 4.1 |
| Silica extender*** | 171 | 7.9 | 171 | 7.9 |
| | 521 | 49.16 | 386 | 33.0 |

*Such as Capcure 65
**Such as TiPure 960, available from DuPont
***Such as Minex 4, which is a silicate ground to a fine powder or Novacite 550, which is pure $SiO_2$ ground to a fine powder
****Emulsion of 95 parts liquid epoxy resin, 5 parts emulsifier solids such as Capcure 65, the above at 80% of non-volatile in water
*****Such as DOW RAP 213 solids content in weight percent 48%

A coating composition prepared by combining Parts A and B in a 1:1 ratio and applied by spraying onto an asphalt substrate would exhibit excellent drying, strength, adhesion and color. If glass beads were introduced, the composition would also exhibit outstanding bead retention under heavy traffic conditions.

13. Preparation and Application of Asphalt Emulsion

An asphalt emulsion based coating could be prepared and applied in accordance with the present invention as described below.

First, Part A is blended from the following components:

100 gm. Akzo cationic asphalt emulsion CSS-1 Zeta potential 22 millivolts, solids 61.6%

50 gm. glyoxal 40% (adjusted to pH 6 with $NaHCO_3$)

50 gm. 60% solids emulsion of liquid epoxy resin using Capcure 65 emulsifier (non-ionic)

Blending is accomplished merely by stirring the components together to produce a stable mixture which does not coagulate or form a skin on its surface.

About 30 gm. of the above mixture is combined with Part B which is comprised of 30 gm. of urea-formaldehyde (30%), hexamethylene diamine (30%) and Jeffamine D400(40%) and 5 g of Ba(OH).8(OH). The resulting product will immediately turn solid and non-tacky, and a small amount of water will squeeze out of the resulting solid lump.

Acceptable asphalt emulsion based coatings would be obtained if the epoxy of Part A above were deleted or if some or all of the epoxy were replaced with polyvinyl acetate latexes, vinyl acrylic latexes, acrylic latexes, styrene-acrylic latexes and styrene-butadiene latexes. In addition, if the cationic asphalt emulsion described above were replaced with a nonionic or an anionic asphalt emulsion, acceptable asphalt emulsion based coatings would also be obtained, both with epoxy resin, and/or with the indicated alternative coating materials.

If desired, Parts A and B above could be sprayed through a single or a double nozzle spray machine as described with respect to the asphalt-free compositions to lay down a rapid cure coating suitable for airport tarmacs and aprons, parking lots and even for paving thin layers on streets. The resulting coatings would resist gasoline, fuel oil and other organic solvents. In fact, sand and similar filling materials could be combined into the coatings and sprayed in place in the same manner as described above with respect to the glass beaded traffic paints, thus providing an asphalt/aggregate coating. Finally, as in the case of the asphalt free coatings, these various coatings could be applied under wet and cool weather conditions.

14. Preparation and Application of 100 Mil Thick Protective Coating To Inside Of Petroleum Storage Tanks Steel petroleum storage tanks require a lining to prevent the growth of microorganisms at the petroleum/water interface in the water that collects in the tanks due to condensation. The microorganisms are undesirable because they form a slime which can foul fuel oils, jet fuels, etc.

Conventional polyester coatings used in the past have had a number of drawbacks, including cracking due to rapid cure, the release of undesirable volatile styrene monomers and sagging on vertical and overhead surfaces due to the necessary thickness of these coatings in these applications.

A system for application to petroleum storage tanks could be prepared in accordance with the present invention, as follows:

| | | |
|---|---|---|
| (a) | Part A | |
| | 12 | parts by weight of 40% glyoxal |
| | 50 | parts by weight of an emulsion of conventional liquid epoxy resin (solids approximately 55%) |
| (b) | Part B | (reacted as set forth in Example 7; diluted to 80% in water) |
| | 25.4% | hexamethylene diamine (3.0 moles) |
| | 29% | Jeffamine D-400 (1.0 moles) |
| | 17.8% | monoethanolamine (4.0 moles) |
| | 27.7% | urea-formaldehyde as N,N'—bis(methoxymethyl) uron (2.0 moles or 0.583 equivalents) |

The above materials, shown as in their charge weights, were reacted as illustrated in Examples 7 and 8 and 5% by weight of $Ca(OH)_2$ was then added using a high speed disk impeller paint mixer.

Parts A and B were applied to vertical metal surfaces using a single spray system with a Binks 43 PA type gun and the formulation described above, at 100 mils thickness. No significant sagging was observed and the resulting epoxy coating will not crack and was expected to have outstanding solvent and water resistance enabling it to protect the sprayed surface from petroleum products for an extended period of time at least equal to that obtained with polyester coatings of like thicknesses.

15. Preparation and Application of 120 Mil Traffic Paint Coating

A system for application of 120 mil thick traffic stripes could be prepared as follows:

| Part A (50 gallons) | | |
|---|---|---|
| glyoxal | 113.08 | lb. |
| $H_2O$ | 136.31 | lb. |
| Capcure 65 | 12.35 | lb. |
| Epoxy emulsion (85% solids) | 72.22 | lb. |
| Defoamer | 0.95 | lb. |
| $TiO_2$ | 113.08 | |
| Minex 4 | 226.16 | |
| | 674.15 | lb. (50 gallons) |

The epoxy emulsion shown above was prepared as an 85% solids oil-in-water emulsion by combining the above components in a planetary mixer as described in U.S. Pat. No. 3,669,900 at Table 1, Example 5 (columns 5 and 6). The resulting oil-in-water emulsion resembled mayonnaise in consistency.

| Part B | | |
|---|---|---|
| water | 71.75 | lb. |
| curing agent (80% solids in water: 2 moles hexamethylenediamine 2 moles monoethanolamine 1 mole (4 equiv.) N,N'—bis(methoxymethyl) uron | 240.42 | lb. |
| Minex 4 | 170.83 | lb. |
| CaO | 100.00 | lb. |
| | 583.00 | |

If the above formulation was applied to an asphalt road surface with an applicator in which Parts A and B were mixed internally before application and sprayed onto the surface in a single 120 mil thick coating strip. The strip would withstand traffic almost immediately. It would resist curling and yellowing and would exhibit excellent toughness.

16. Preparation of Dual Cure Coatings Using Synthetic Acrylic Latex, Alkyl Emulsions and Epoxy Ester Emulsions The following alternative dual cure rate coatings were prepared in accordance with the invention in order to demonstrate coatings prepared with water-dispersible components other than epoxy resin emulsions.

I. Acrylic Latex

Part B'

1.5 moles 2-methylpentamethylene diamine
0.5 mole Jeffamine D-400
2.0 moles monoethanol amine
1.0 mole (four equivalents) N,N'-bis(methoxymethyl) uron The above components were reacted in the same manner as shown in Examples 6 and 7 to form a "difunctional curing agent." Then 50 grams of 80% of the above difunctional curing agent in water were mixed with 50 gm. of Rhoplex MC-76 which is an acrylic latex for cementitous materials having a solids content (in weight percent) of 46% to 48% and a pH of 9.5 to 10.0, available from Rohm and Haas Company of Philadelphia, Pennsylvania. This mixture of acrylic latex and difunctional curing agent produced a semi-transparent, slightly viscous, yellowish liquid. Next, 35 gm. of glyoxal (in water) were added while stirring with a spatula and a film of the mix was immediately spread on a test panel.

The resulting film was translucent, glossy and yellowish, and became progressively harder and practically tack-free over the next 20 minutes, suggesting its use for coatings for foil, plastic film or paper. The bulk mix became a rubbery mass within about 30 seconds.

In another application, UCAR 503 (47% solids; available from Union Carbide) was successfully used in the following formulation:

| | |
|---|---|
| Part A | |
| Water | 75 lb. |
| Glyoxal | 100 lb. |
| $TiO_2$ | 90 lb. |
| Minex 4 | 250 lb. |
| 62.5% Epoxy Emulsion | 64 lb. |
| UCAR 503 | 90 lb |
| | 669 lb. (50 gal.) |
| Part B | |
| Water | 100 lb. |
| Difunctional Curing agent (prepared as in Example 7) | 200 lb. |
| $Ca(OH)_2$ | 100 lb. |
| $CaCO_3$ Pigment | 200 lb. |
| M-405 | 105 lb. |
| | 705 lb. (50 gal.) |

As with the Rhoplex MC-76, when the coating composition was applied to a steel test panel, the resulting film was transparent, glossy and yellowish, and rapidly became harder and practically tack-free. The bulk mix became a rubbery mass within about 30 seconds.

II. Alkyd

A 30 gm. sample of glyoxal (40% in water) was mixed with 50 gm. of an emulsion of 57% soy oil alkyd, at a level of about 60% solids in water. The emulsion had a particle size of 1.0 microns and contained 0.1% Co, 0.05% Mn, and 0.1% Ca as dryers. The resulting product was a low viscosity oil-in-water emulsion which, when combined with 50 gm. of Part B' above (curing agent in absence of the Rhoplex MC-76), produced a smooth, somewhat viscous mixture. When applied to a cardboard test chart, the film polymerized in about 20-30 minutes and bulk-hardened in about 30 seconds.

III. Epoxy Ester 30 gm. of a 40% glyoxal (in water) was combined with 50 gm. of an emulsion of an epoxy ester of tall oil fatty acids (50% epoxy resin and 50% tall oil fatty acids). The emulsion was about 60% solids and had a particle size of about 1.0 microns. The emulsion is available as a commercial product under the trademark CEE5, from Pacific Anchor Company of Los Angeles, California. 50 gm. of Part B' above was stirred into the mixture, to produce a smooth, somewhat viscous mixture. When the mixture was applied to a cardboard test chart, the film polymerized in about 20-30 minutes and bulk-hardened in about 30 seconds.

In summary, the above synthetic acrylic latex, alkyd and epoxy ester emulsion based coatings produced films that polymerized rapidly at room temperature, despite the absence of epoxy component, by way of the glyoxal/Part B' reactions. After drying, the additional water-dispersible resin (latex, alkyd and epoxy ester) gave hardness and toughness to the coatings.

17. Coating Utilizing Melamine/Glyoxal And Portland Cement As Source of $Ca(OH)_2$ Tests were undertaken to demonstrate the contribution of $Ca(OH)_2$ to the properties of coatings prepared in accordance with the invention. In the tests, portland cement was used as the source of the $Ca(OH)_2$.

Part A in these tests was the reaction product of melamine and glyoxal with the melamine and glyoxal present in a weight ratio of about 1:8. (See Example 6).

Part B before introduction of the portland cement, comprised a combination of the following compositions, denoted (1) and (2):

| | Percentage By Weight |
|---|---|
| Composition (1) | |
| Jeffamine D400 | 70% |
| Hexamethylene diamine | 15% |
| Urea-formaldehyde monomer | 15% |
| Composition (2) | |
| 2-methylpentamethylene diamine | 69% |
| Monoethanolamine | 7% |
| Urea-formaldehyde monomer | 24% |

200 pounds of compositions (1) and (2) were used on a 1:2 weight ratio basis and combined with 100 pounds of portland cement to complete the preparation of Part B of the composition. In an alternate embodiment, portland cement was not used.

Parts A and B were mixed and applied as road stripes about 10 mils thick to an asphalt roadway. The stripes could be driven over in 60 seconds or less without incurring any paint pick-up or damage to the stripes. In fact, after 6 minutes, car tires could be turned on the stripes without significant damage.

In the absence of the portland cement it was found that the cure occured at a rate roughly half as fast as that obtained with the portland cement.

In a further test of the portland cement containing coating composition, stripes in excess of 100 mils in thickness were applied. The stripes showed good adhesion to the asphalt substrate, without cracking or curling.

18. Preparation of Vinyl Aldehyde; Polmerization With High Molecular Weight Acrylates Into a 500 ml. open flask, with magnetic stirrer bar and thermometer were added:

| | |
|---|---|
| acrylamide | 1 mole (71 gm.) |
| glyoxal (40%) | 2 moles (116 gm.) |

Upon dissolution of the acrylamde, the solution cooled to about 10° C. The pH was then adjusted from about 1.0 to about 6.5 by adding 40% NaOH. As solution was heated to 40° C., pH went to about 6.0 and a slight exotherm to 47° C. was observed. The solution was allowed to cool whereupon it dropped to pH 5.0. 10 gm. of the above was mixed with the following:

| | | |
|---|---|---|
| Jeffamine D400 | 73.3% | 5 moles |
| HMDA | 12.8% | 3 moles |
| Urea-formaldehyde monomer | 13.9% | 2 moles |

Within 30 seconds, a semi-solid reaction product was formed.

If the glyoxal/acrylamide product is polymerized with styrene or a mixture of higher molecular weight acrylate monomers, the resulting aldehyde-containing copolymer will show good activity when reacted with Part A of the composition of the invention.

While the present invention is described above in connection with preferred or illustrative embodiments, these embodiments are not intended to be exhaustive or limiting of the invention. Rather, the invention is intended to cover all alternatives, modifications and equivalents which may be included within its spirit and scope, as defined by the appended claims.

What we claim is:

1. A water-based coating composition comprising:

a mixture of Part A and Part B components;

said Part A component comprising a mixture of polyaldehyde chosen from the group consisting of glyoxal, glutaraldehyde and derivatives of either of these which retain free aldehyde groups, and an aqueous component selected from the group consisting of (I) epoxy resin emulsions, (II) an aqueous component other than an epoxy resin emulsion selected from the group consisting of synthetic latexes stable at pH 7 or less, low molecular weight resin emulsions, epoxy ester emulsions, water emulsified alkyds, and cationic-, anionic- and non-ionic asphalt emulsions, and (III) mixtures of (I) and (II); and said Part B component comprising the non-gel reaction product of (I) urea-formaldehyde ether monomer, urea-formaldehyde phenol monomer, urea-nonylphenol formaldehyde monomer, thiourea-formaldehyde ether monomer, melamine formaldehyde ether monomer hexamethoxymethyl melamine, with (II) a polyamine chosen from the group consisting of primary amines, and secondary amines and amide-amines, and with (III) a hydroxide or an oxide of calcium, strontium or barium.

2. The water-based coating composition of claim 1 in which the polyaldehyde is chosen from the group consisting of the reaction products of glyoxal and urea, glyoxal and urea and formaldehyde, glyoxal and melamine, glyoxal and melamine and formaldehyde, glutaraldehyde and urea, glutaraldehyde and urea and formaldehyde, glutaraldehyde and melamine, glutaraldehyde and melamine and formaldehyde.

3. The water-based coating composition of claim 1 wherein the polyaldehyde is the reaction product of glyoxal and melamine.

4. The water-based coating composition of claim 3 wherein the glyoxal and melamine are reacted in a mole ratio of at least about 1:6.

5. The water-based coating composition of claim 1 wherein the polyaldehyde is a reaction product of acrylamide and glyoxal or glutaraldehyde, or a reaction product of acrylamide and a derivative of either which retains reactive aldehyde groups.

6. The water-based coating composition of claim 5 wherein the glyoxal, glutaraldehyde or reaction product of a derivative of either is reacted with the acrylamide in a mole ratio of about 2:1 based on aldehyde moieties.

7. The water-based coating composition of claim 5 wherein the reaction product of glyoxal, glutaraldehyde, or reaction product of a derivative of either and acrylamide is copolymerized with conventional vinyl monomers to form a latex.

8. The water-based coating composition of claim 5 wherein the acrylamide is copolymerized with conventional vinyl monomers before it is reacted with glyoxal, gluteraldehyde, or reaction product of a derivative of either.

9. The water-based coating composition of claim 5 wherein the acrylamide is copolymerized with conventional vinyl monomers before it is reacted with glyoxal, gluteraldehyde, or reaction product of a derivative of either to form a copolymer containing about 2–15% by weight acrylamide.

10. The water-based coating composition of claim 5 wherein the acrylamide is copolymerized with conventional vinyl monomers before it is reacted with glyoxal, gluteraldehyde, or reaction product of a derivative of either to form a copolymer containing about 5 to 10 percent by weight acrylamide.

11. The water-based coating composition of claim 5 wherein the acrylamide is copolymerized with conventional vinyl monomers before it is reacted with glyoxal, gluteraldehyde, or reaction product of a derivative of either to form a copolymer containing about 5 percent by weight of acrylamide.

12. The water-based coating composition of claim 1 wherein the polyamine of the Part B component is chosen from the group consisting of hexamethylene diamine, polyoxypropylene diamine, polyoxypropylene triamine, polyoxyethylenediamine, trimethyl hexamethylene diamine, isophorone diamine, 2-methylpentamethylene diamine, 1,2-diamine cyclohexane and xylene diamine.

13. The water-based coating composition of claim 1 wherein the polyamine of the Part B component is a primary amine.

14. The water-based composition of claim 13 wherein the primary amine is hexamethylene diamine.

15. The water-based composition of claim 13 wherein the primary amine is polyoxypropylene diamine.

16. The water-based composition of claim 1 wherein the polyamine of Part B is blended with a monoamine in a mole ratio of polyamine to monoamine of about 1:0 to 1:3.

17. The water-based composition of claim 16 wherein the monoamine is monoethanolamine.

18. The water-based composition of claim 1 wherein Part B comprises the reaction product of two moles hexamethylene diamine, two moles monoethanolamine and one mole N,N'-bis(methoxymethyl) uron.

19. The water-based composition of claim 1 wherein Part B comprises the reaction product of three moles hexamethylene diamine, one mole monoethanolamine and one mole N,N'-bis(methoxymethyl) uron.

20. The water-based composition of claim 1 wherein the Part B component comprises the non-gel reaction product of N,N'-bis(methoxymethyl) uron and a polyamine in a mole ratio of about 3:2 to 1:5.

21. The water-based composition of claim 1 wherein the polyamine is a combination of polyoxypropylene diamine and hexamethylene diamine, the polyoxypropylene diamine has a molecular weight of about 230 to 400, and the mole ratio of the hexamethylene diamine to the polyoxypropylene diamine is from about 4:1 to 1:4.

22. The water-based composition of claim 1 in which pigments are introduced into the composition at a level of about 30 to 55 pigment volume concentration by blending the pigments into Part A and/or Part B of the composition.

23. The water-based composition of claim 1 in which particulate matter is introduced into the composition at a level of about 3 to 15 pounds per gallon of the composition.

24. The water-based composition of claim 23 in which the particulate matter is sand.

25. The water-based composition of claim 23 in which the particulate matter is glass beads.

26. The water-based coating composition of claim 1 wherein a hydroxide or an oxide of calcium is used.

27. The water-based coating composition of claim 26 wherein $Ca(OH)_2$ is used.

28. The water-based coating composition of claim 27 wherein portland cement is used as the source of $Ca(OH)_2$.

* * * * *